United States Patent [19]
Malagrino, Jr. et al.

[11] Patent Number: 5,818,665
[45] Date of Patent: Oct. 6, 1998

[54] ROTARY ACTUATOR ARRANGEMENT AND METHOD OF MANUFACTURE

[75] Inventors: Gerald D. Malagrino, Jr.; Jeff Mason, both of Rochester, Minn.

[73] Assignee: Western Digital Corporation, Irvine, Calif.

[21] Appl. No.: 756,779

[22] Filed: Nov. 26, 1996

[51] Int. Cl.⁶ .................................................. G11B 5/55
[52] U.S. Cl. ............................................................ 360/106
[58] Field of Search ................................... 360/107, 101, 360/97.01, 99.08, 77.02; 369/244–245, 255

[56] References Cited

U.S. PATENT DOCUMENTS

| | | | |
|---|---|---|---|
| 5,056,078 | 10/1991 | Carey et al. | 369/77.2 |
| 5,146,450 | 9/1992 | Brooks et al. | 369/244 |
| 5,235,481 | 8/1993 | Kamo et al. | 360/97.01 |
| 5,265,325 | 11/1993 | Fortin | 29/742 |
| 5,293,282 | 3/1994 | Squiires et al. | 360/77.08 |
| 5,404,636 | 4/1995 | Stefansky et al. | 29/603 |
| 5,502,604 | 3/1996 | Furay | 360/97.01 |
| 5,513,055 | 4/1996 | McGrath | 360/99.08 |
| 5,627,702 | 5/1997 | Kelemen et al. | 360/106 |

*Primary Examiner*—John H. Wolff
*Attorney, Agent, or Firm*—Leo J. Young; W. Chris Kim

[57] ABSTRACT

A head disk assembly for a disk drive comprises a base, a bearing cartridge, a head stack assembly, and an elongated member. The bearing cartridge includes an inner shaft and an outer sleeve, the shaft being attached to the base and defining a pivot axis and the outer sleeve being rotatable relative to the pivot axis. The outer sleeve has a cylindrical sleeve surface. The head stack assembly includes an actuator body. The actuator body has a bore and a slot located adjacent to the bore such that the slot opens into the bore. The bore has a bore surface that defines a pair of ridges extending parallel to the length of the bore. The bearing cartridge is disposed within the bore. The elongated member is more compliant than the bore surface and more compliant than the sleeve surface, and is disposed in the slot and is compressed to provide a reacting force along a first contact line parallel to the pivot axis to bias the sleeve surface against the ridges to provide second and third contact lines each parallel to the pivot axis.

14 Claims, 4 Drawing Sheets

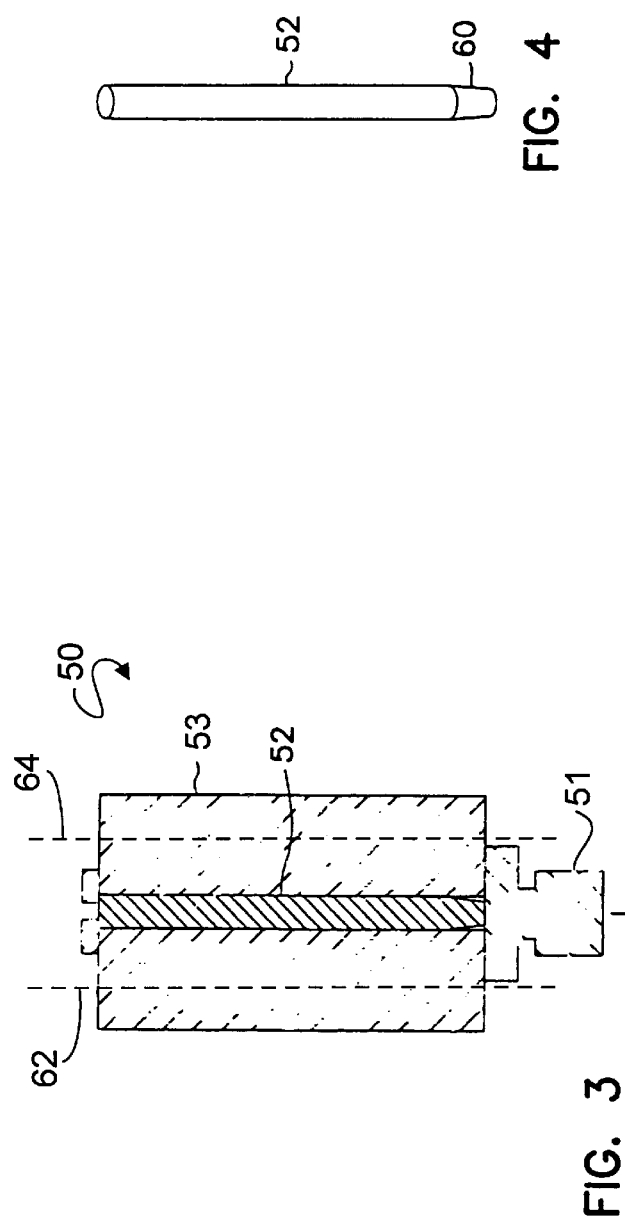
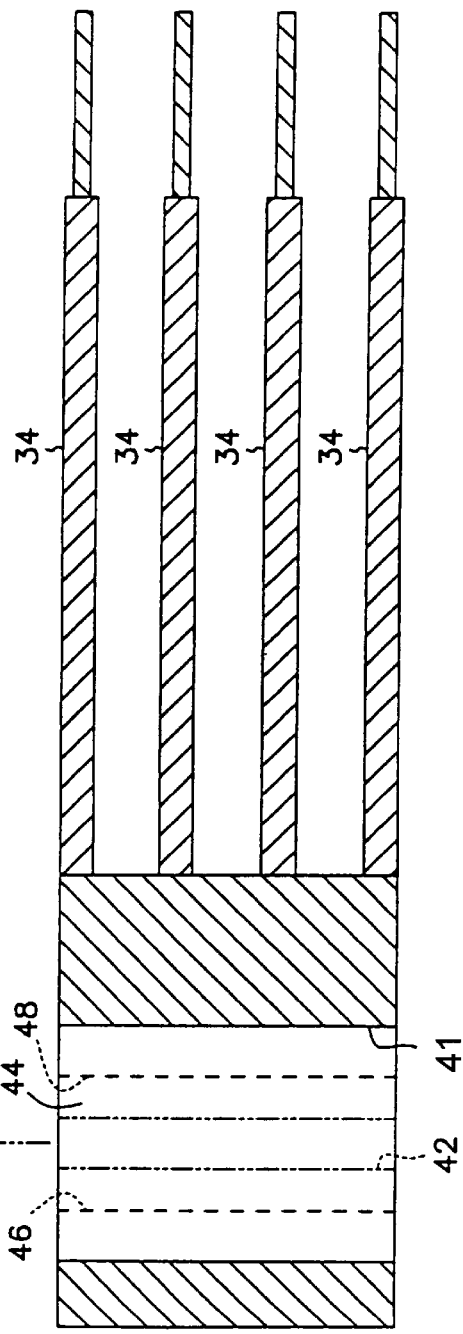
FIG. 3
FIG. 4

ROTARY ACTUATOR ARRANGEMENT AND METHOD OF MANUFACTURE

BACKGROUND OF THE INVENTION

1. Field of the Invention

This invention relates to hard disk drives. More particularly, this invention relates to a rotary actuator arrangement for a hard disk drive and to a method of assembly for the rotary actuator arrangement.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly The head disk assembly includes an enclosure including a base and a cover; at least one disk having at least one recording surface; a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a bearing cartridge and a head stack assembly. Other components of the rotary actuator arrangement are permanent magnets and an arrangement for supporting the magnets to produce a magnetic field for a voice coil motor. The head stack assembly includes a coil forming another part of the voice coil motor. The head stack assembly also includes an actuator body having a bore through it, and a plurality of arms projecting parallel to each other and perpendicular to the axis of the bore. The head stack assembly also includes head gimbal assemblies that are supported by the arms. Each head gimbal assembly includes a load beam and a head supported by the load beam.

The bearing cartridge includes an outer sleeve and an inner shaft with the inner shaft being attached to the base to define an axis of rotation for the rotary actuator. Generally, the cost of the components in, and the subassembly cost of, the rotary actuator arrangement is a significant portion of the overall cost to mass produce a drive. Accordingly, substantial research and development efforts have been expended in efforts to provide a low-cost rotary actuator arrangement, and numerous patents have issued relating to rotary actuator arrangements.

Certain of the patents relating to rotary actuator arrangements disclose metal actuator bodies, and others disclose plastic actuator bodies.

One example of a patent disclosing a metal actuator body is U.S. Pat. No. 5,146,450 (the "Brooks patent") in which a bearing cartridge is attached to a metal actuator body of a head stack assembly. The Brooks patent asserts that employing hardened steel for the bearing cartridge provides an advantage in that hardened steel is very wear resistant. The Brooks patent recommends magnesium as the material for the actuator body. The Brooks patent asserts that the attachment of the bearing cartridge to the actuator body can result in problems of stresses in the actuator body causing the read/write heads to be positioned out of alignment, and proposes as a solution to that problem a method of attaching the bearing cartridge to the head stack assembly. The proposed method includes: providing a threaded opening in the outer sleeve of the bearing cartridge, the threaded opening being perpendicular to the inner shaft; providing a lateral hole in the actuator body in the actuator body, the lateral hole being perpendicular to the bore; inserting the bearing cartridge into the bore; aligning the threaded opening with the lateral hole; and passing a machine screw through the aligned opening and hole to attach the cartridge to the actuator body. Also, the Brooks patent discloses providing a slot in the outer sleeve of the bearing cartridge into which a liquid adhesive may be forced after inserting the bearing cartridge into a bore in the actuator body, thereby gluing the bearing cartridge to the actuator body. Other representative prior art techniques are disclosed in U.S. Pat. Nos. 5,404,636 to Stefansky et al., 5,235,481 to Kamo et al., and 5,513,055 to McGrath et al. These all disclose techniques for providing a rigid connection between a bearing cartridge and an actuator body.

Each of numerous other patents discloses a plastic actuator body including U.S. Pat. No. 5,382,851 to Loubier and U.S. Pat. No. 5,165,090 to Takahashi, et al.

Prior art methods of attaching the bearing cartridge to the actuator body can result in performance problems relating to unwanted changes in the spatial relationship among the several individual read/write heads. Such unwanted changes can occur from the actuator body becoming distorted as temperature increases and decreases cause differential expansions and contractions in adjacent components that are constrained together in an undesirable way. An especially undesirable result involves unequal thermal expansion that distorts the actuator body and displaces the heads with respect to one another. Such unwanted displacement can cause longer seek times because switching between heads then requires repositioning the newly selected head over the target track. The tracks are initially written with each head in a predetermined fixed position with respect to the other heads, even when the heads are disposed slightly out of the desired alignment. With unbalanced thermal expansion, the arms can twist slightly, thereby moving the heads with respect to their initial relative positions. Because the data tracks on the disk surface are densely packed, this slight head movement may be enough to move the head to a position over a neighboring track in a different cylinder with respect to another head in the same actuator assembly. Under these circumstances, additional small track-to-track seeks are necessary when switching between heads. Even such small seeks are time-consuming and degrade disk drive performance.

A need exists for a low-cost rotary actuator and method of manufacture that reduces or eliminates such performance losses and provides a secure attachment between the bearing cartridge and the actuator body.

SUMMARY OF THE INVENTION

This invention can be regarded as a method for assembling a head disk assembly that incorporates a rotary actuator arrangement. The rotary actuator arrangement includes a bearing cartridge and a head stack assembly. The bearing cartridge includes an inner shaft and an outer sleeve. The shaft defines a pivot axis and the outer sleeve is rotatable relative to the pivot axis. The outer sleeve has a cylindrical sleeve surface. The head stack assembly includes an actuator body having an elongated bore therein. The bore has a bore surface that defines a pair of ridges extending parallel to the length of the bore. The method comprises the step of placing an elongated member on the outer sleeve parallel to the pivot axis, the member being more compliant than the bore surface and more compliant than the sleeve surface. The method further comprises the step of forcing the bearing cartridge and the elongated member into the bore such that the elongated member is compressed and provides a reacting force along a first contact line parallel to the pivot axis to bias the sleeve surface against the ridges to provide second and third contact lines each parallel to the pivot axis.

Preferably, the actuator body includes a slot extending parallel to the axis of the bore and opening to the bore surface. The preferred method comprises the step of placing the elongated member in the slot. The preferred method further comprises the step of placing the bearing cartridge into the bore such that the elongated member is compressed and provides a reacting force along a first contact line parallel to the pivot axis to bias the sleeve surface against the ridges to provide second and third contact lines each parallel to the pivot axis.

This invention can also be regarded as a head disk assembly for a disk drive. The head disk assembly comprises a base, a spindle hub rotatably coupled to the base, a disk secured to the spindle hub and having a recording surface, a bearing cartridge, a head stack assembly, and an elongated member. The bearing cartridge includes an inner shaft and an outer sleeve. The shaft is attached to the base and defines a pivot axis. The outer sleeve is rotatable relative to the pivot axis, and has a cylindrical sleeve surface. The head stack assembly includes an actuator body, a coil for a voice coil motor, transducer means for reading and writing from and to the recording surface, and means suspending the transducer means from the actuator body. The actuator body has an elongated bore and a slot located adjacent to the bore such that the slot opens into the bore. The bore has a bore surface that defines a pair of ridges extending parallel to the length of the bore. The bearing cartridge is disposed within the bore. The elongated member is more compliant than the bore surface and more compliant than the sleeve surface, and is disposed in the slot and is compressed to provide a reacting force along a first contact line parallel to the pivot axis to bias the sleeve surface against the ridges to provide second and third contact lines each parallel to the pivot axis.

A head disk assembly embodying and made in accordance with this invention has advantages. These advantages include reducing the stress between the actuator body and the bearing cartridge that otherwise creates a risk of distortion arising from differences in thermal expansion. The elongated member being the most compliant element involved in the attachment of the actuator body to the bearing cartridge reduces stress by compressing and expanding throughout the first contact line. Reducing this stress minimizes physical twisting of the individual actuator arms. The attachment method of this invention also maintains a secure attachment between the bearing cartridge and the actuator body throughout the range of operating temperatures for the disk drive. Misalignment of the read/write heads resulting from stress at the actuator arm and bearing cartridge interface can also minimized.

BRIEF DESCRIPTION OF THE DRAWINGS

FIG. 3 is a schematic cutaway exploded-view of the head stack assembly, bearing cartridge, and elongated member;

FIG. 4 is an isometric view of the elongated member;

DESCRIPTION OF THE PREFERRED EMBODIMENT

Figure 1:
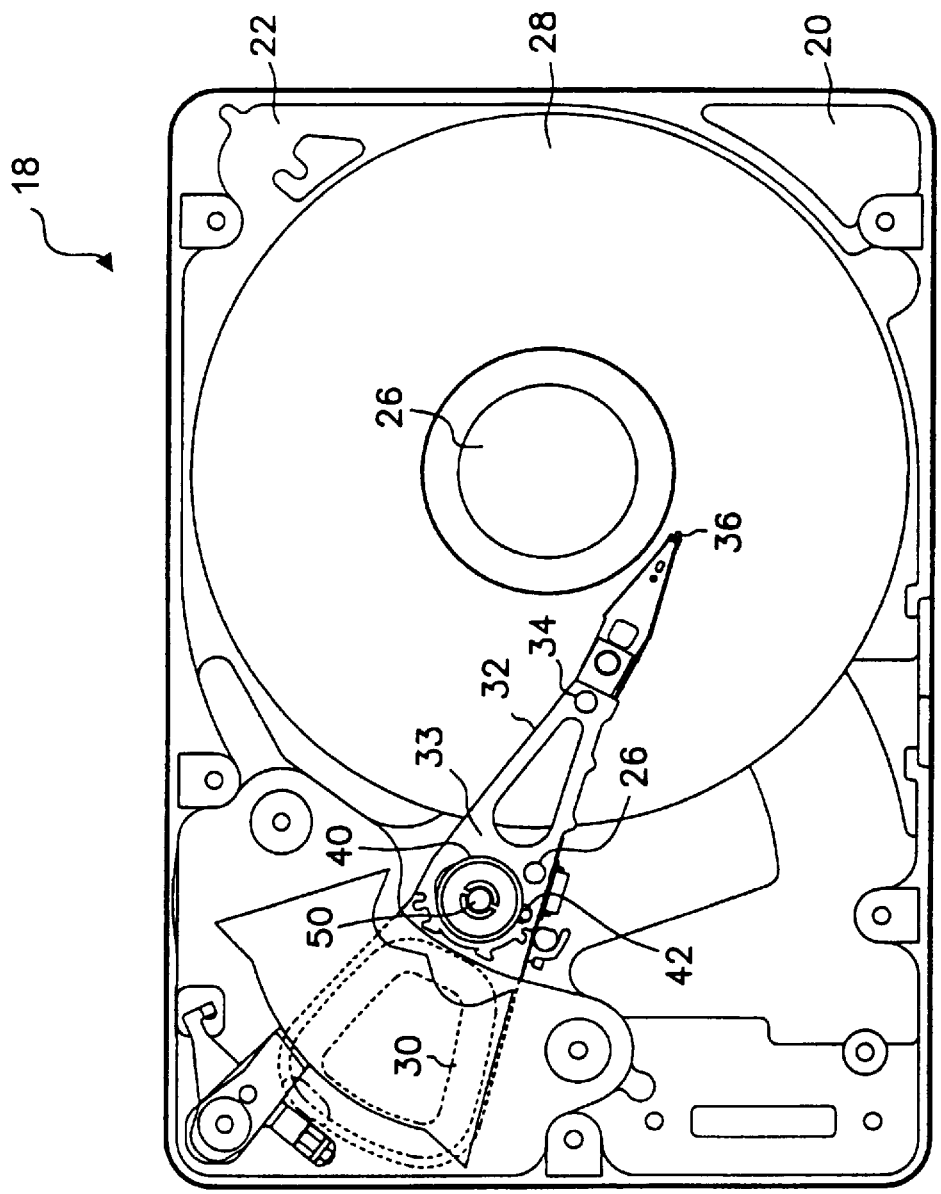
FIG. 1 is a top view of a head disk assembly for disk drive in which the head disk assembly includes a rotary actuator arrangement in accordance with a preferred embodiment of this invention.

Referring to FIG. 1, a hard disk drive 18 in accordance with the preferred embodiment of this invention includes a head disk assembly ("HDA") 20 and a printed circuit board assembly (not shown). HDA 20 includes a base 22 and a cover (not shown) that mate to define an enclosure. HDA 20 includes a spindle hub 26 rotatably coupled to base 22, a spindle motor (not shown), and a disk having a magnetic recording surface 28. Spindle hub 26 is rotatably coupled to base 22 by the spindle motor which in operation causes spindle hub 26 to rotate. Spindle motor driver circuitry (not shown) is provided, suitably in the printed circuit board assembly, to supply electric current for the spindle motor to produce a torque and controllably rotate spindle hub 26.

HDA 20 further includes a rotary actuator arrangement which includes a head stack assembly ("HSA") 32 and a bearing cartridge 50. HSA 32 includes an actuator body 33 having an elongated bore 40 and a slot 42 located adjacent to bore 40 such that slot 42 opens into bore 40. HSA 32 further includes a coil 30 and a plurality of arms including arm 34, and a plurality of sliders including slider 36. Coil 30 cooperates with a permanent magnet arrangement portion of the rotary actuator arrangement to form a voice coil motor. Slider 36 constitutes a transducer means for reading and writing from and to recording surface 28, and is suspended from arm 34 by a load beam in conventional manner. In operation, the voice coil motor receives current from a motor driver circuit and responds by applying torque to head stack assembly 32 to swing slider 36 to a desired radial position adjacent recording surface 28.

Figure 2:
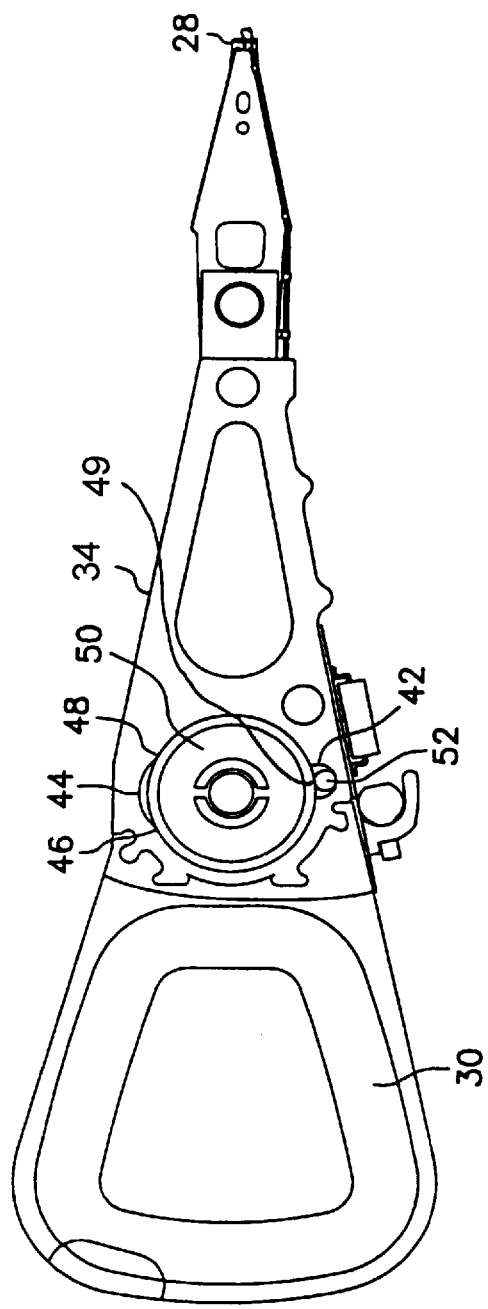
FIG. 2 is a top view of a head stack assembly and bearing assembly positioned therein and secured in place by an elongated member.

Referring to FIGS. 2, 3, and 4, the rotary actuator arrangement further includes an elongated member or pin 52 that is disposed in slot 42 and that has a chamfered end 60. Bearing cartridge 50 includes an inner shaft 51 and an outer sleeve having a sleeve surface 53. Shaft 51 is attached to base 22 and defines a pivot axis. The outer sleeve is rotatable relative to the pivot axis. Bore 40 has a bore surface 41 that has a shape defining a trough 44 which in turn defines a pair of ridges 46 and 48 extending parallel to the length of the bore. Bearing cartridge 50 is disposed within bore 40. Pin 52 is more compliant than bore surface 41 and more compliant than sleeve surface 53, and while disposed in slot 42 is compressed to provide a reacting force along a first contact line 49 (FIG. 2) parallel to the pivot axis to bias sleeve surface 53 against ridges 46 and 48 to provide second and third contact lines each parallel to the pivot axis.

As disk drive 18 operates, its internal operating temperature changes. Actuator body 33 is suitably made of a different material than bearing cartridge 50 so the coefficient of thermal expansion for the material of the actuator assembly 32 and the coefficient of thermal expansion for bearing cartridge 50 usually differ. Pin 52 accommodates these thermal expansion coefficient differences and keeps bearing cartridge 50 properly secured within bore 40 of actuator body 33. When bearing cartridge 50 expands more than actuator body 33, pin 52 is subjected to added compressive force and reacts by providing more reacting force against bearing cartridge 50. When bearing cartridge 50 expands less than actuator body 33, pin 52 is subjected to less compressive force and reacts by providing less reacting force against bearing cartridge 50 and by expanding to maintain the force on bearing cartridge 50 necessary to hold bearing cartridge 50 in bore 40.

An advantage provided by this invention arises because bearing cartridge 50 is held along three contact lines, namely first line of contact 49 between pin 52 and sleeve surface 53, a second line of contact between ridge 46 and sleeve surface 53, and a third line of contact between ridge 48 and sleeve surface 53. Holding bearing cartridge 50 by forcing it onto three lines of contact minimizes stress transfer to actuator body 33 when disk drive 18 cycles through thermal changes. When the height of bearing cartridge 50 changes with respect to the height of actuator body 33 during a thermal cycle, sleeve surface 53 slides along on the three lines of contact. When the diameter of bearing cartridge 50 increases with respect to the diameter of bore 40 in actuator body 33 during a thermal cycle, sleeve surface 53 merely compresses pin 52. When the diameter of bearing cartridge 50 decreases with respect to the diameter of bore 40 in actuator body 33 during a thermal cycle, pin 52 expands to urge bearing cartridge 50 into contact with the three contact lines, thereby holding bearing cartridge 50 within bore 40.

Thus, little stress is transferred to actuator body 33 compared with the stress transferred when using prior art attachment methods. Without transfer of axial warping stresses to HSA 32, heads remain in relative alignment with one another.

Bearing cartridge 50 can move with respect to actuator body 33 without pulling at any specific attachment point on actuator body 33. Pin 52 not only reduces but also controls the stress transferred to actuator body 33.

The use of pin 52 in attaching bearing cartridge 50 to actuator body 33 also provides certain other advantages. Pin 52 operates to dampens unwanted vibrations. Also, manufacturing costs are reduced because the procedure of this invention for attaching bearing cartridge 50 to actuator body 33 can reduce operator time compared with known methods requiring one or more screws or other fasteners for attaching a bearing cartridge to an actuator body. Moreover, by punching out pin 52, bearing cartridge 50 can be removed from actuator body 33 for rework if necessary without damage.

FIG. 4 shows an embodiment of pin 52. Pin 52 has a height that is about the same as the height of bearing cartridge 50 and the length of slot 42 in actuator body 33. Pin 52 consists essentially of a material that is more compliant than either of the materials used to make actuator body 33 or bearing cartridge 50. For example, in an embodiment in which bearing cartridge 50 is made of stainless steel and actuator body 33 is made of magnesium or aluminum, then pin 52 is preferably made of a plastic that is more compliant than either stainless steel or magnesium. On the other hand, in an embodiment in which bearing cartridge 50 is made of stainless steel and actuator body 33 is made of plastic, then pin 52 is preferably made of a urethane material having a durometer reading of 10 units, which is more compliant than either stainless steel or plastic.

Chamfered end 60 of pin 52 allows for easier starting when press-fitting pin 52 into slot 42 after bearing cartridge 50 has been positioned within bore 40. Chamfered end 60 also allows for easier starting of the alternative preferred method of assembly, where pin 52 is first positioned along the outside of bearing cartridge 50 and the combination is then press-fit together into bore 40 and slot 42. Although FIG. 4 shows pin 52 embodied as a cylindrical pin or rod, other cross-sections may also be advantageously used within the scope of this invention.

Figure 5:
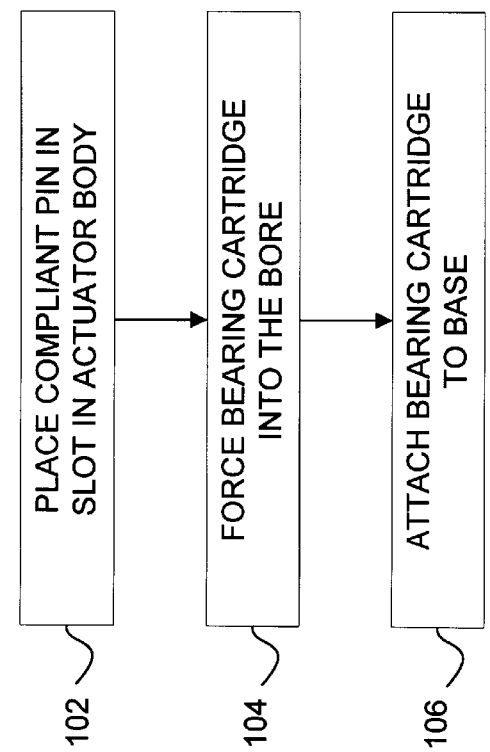
FIG. 5 is a flow diagram of a first assembly method according to this invention.

FIG. 5 provides a flowchart showing the steps involved in the first assembly method. In the placing step 102 pin 52 is placed in slot 42. In the forcing step 104, bearing cartridge 50 is forced into bore 40. In the attaching step 106, bearing cartridge 50 is attached to base 22 of HDA 20, completing the attachment of HSA 32. Of course, the attachment of bearing cartridge 50 to actuator body 33 can occur at other stages of the assembly process for HSA 32.

Figure 6:
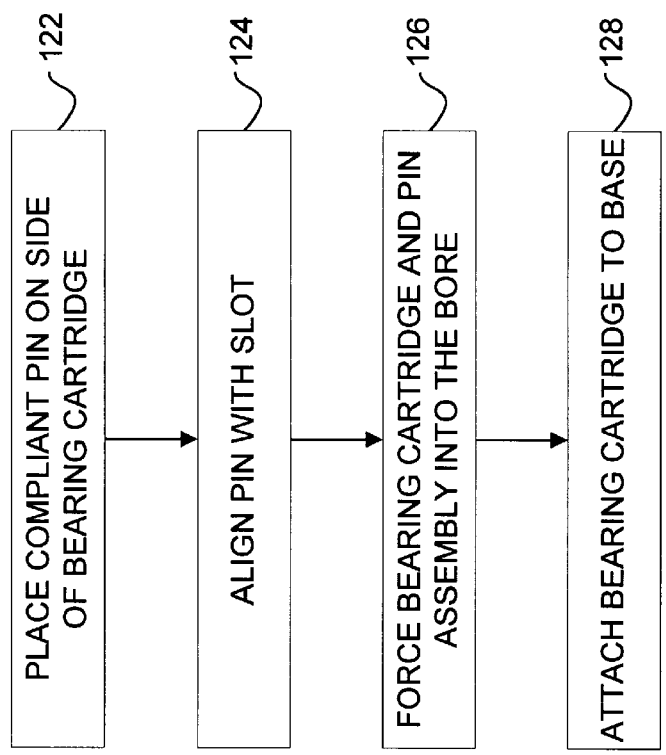
FIG. 6 is a flow diagram of a second assembly method according to this invention.

FIG. 6 details the second assembly method. In the placing step 122, pin 52 is placed along the side of bearing cartridge 50. In the aligning step 124, pin 52 is aligned with slot 42. In the forcing step 126, bearing cartridge 50 and pin 52 in combination are forced into bore 40. Finally, in the attaching step 128, bearing cartridge 50 is attached to base 22. This provides the solid attachment to base 22 needed to give HSA 32 a rigid pivot axis. Of course the attachment of bearing cartridge 50 to actuator body 33 can occur at other stages of the assembly process for HSA 32. The attachment of bearing cartridge 50 to base 22 need not immediately follow the method of this invention for attaching bearing cartridge 50 to actuator body 33.

We claim:

1. A method for assembling a head disk assembly incorporating a rotary actuator arrangement that includes a bearing cartridge and a head stack assembly, the bearing cartridge including an inner shaft and an outer sleeve, the shaft defining a pivot axis and the outer sleeve being rotatable relative to the pivot axis and having a cylindrical sleeve surface, the head stack assembly including an actuator body having an elongated bore therein, the bore having a bore surface that defines a pair of ridges extending parallel to the length of the bore, the actuator body further having a slot extending parallel to the axis of the bore and opening to the bore surface, the method comprising the steps of:

placing an elongated member on the outer sleeve parallel to the pivot axis, the member being more compliant than the bore surface and more compliant than the sleeve surface; and forcing the bearing cartridge and the elongated member into the bore such that the elongated member is positioned in the slot and compressed and provides a reacting force along a first contact line parallel to the pivot axis to bias the sleeve surface against the ridges to provide second and third contact lines each parallel to the pivot axis.

2. The method of claim 1 wherein the elongated member is urethane pin.

3. The method of claim 1 wherein the elongated member is a plastic pin, the sleeve surface is stainless steel, and the bore surface is aluminum.

4. The method of claim 1 wherein the elongated member is a plastic pin, the sleeve surface is stainless steel, and the bore surface is magnesium.

5. A method for assembling a head disk assembly incorporating a rotary actuator arrangement that includes a bearing cartridge and a head stack assembly, the bearing cartridge including an inner shaft and an outer sleeve, the shaft defining a pivot axis and the outer sleeve being rotatable relative to the pivot axis and having a cylindrical sleeve surface, the head stack assembly including an actuator body having an elongated bore therein, the bore having a bore surface that defines a pair of ridges extending parallel to the length of the bore, the actuator body further having a slot extending parallel to the axis of the bore and opening to the bore surface, the method comprising the steps of:

placing an elongated member in the slot, the member being more compliant than the bore surface and more compliant than the sleeve surface; and placing the bearing cartridge into the bore such that the bearing cartridge is positioned adjacent to the elongated member and such that the elongated member is compressed and provides a reacting force along a first contact line parallel to the pivot axis to bias the sleeve surface against the ridges to provide second and third contact lines each parallel to the pivot axis.

6. The method of claim 5 wherein the placing step comprises the step of:

forcing the bearing cartridge into the bore over the slot having the elongated member therein.

7. The method of claim 5 wherein the placing step comprises the step of:

forcing the elongated member into the slot while forcing the bearing cartridge into the bore at substantially the same time.

8. The method of claim 5 wherein the elongated member is a plastic pin.

9. The method of claim 5 wherein the elongated member is a urethane pin.

10. A rotary actuator arrangement for a disk drive comprising:

a bearing cartridge a head stack assembly;

an elongated member;

the bearing cartridge including an inner shaft and an outer sleeve, the shaft defining a pivot axis and the outer sleeve being rotatable relative to the pivot axis, the outer sleeve having a cylindrical sleeve surface;

the head stack assembly including an actuator body having an elongated bore and a slot located adjacent to the bore such that the slot opens into the bore;

the bore having a bore surface that defines a pair of ridges extending parallel to the length of the bore;

the bearing cartridge being disposed within the bore;

the elongated member being more compliant than the bore surface and more compliant than the sleeve surface, the elongated member being disposed in the slot such that the elongated member is positioned adjacent to the bearing cartridge and being compressed to provide a reacting force along a first contact line parallel to the pivot axis to bias the sleeve surface against the ridges to provide second and third contact lines each parallel to the pivot axis.

11. The rotary actuator arrangement of claim 10 wherein the elongated member includes an elastomeric material.

12. The rotary actuator arrangement of claim 10 wherein the elongated member includes urethane.

13. The rotary actuator arrangement of claim 10 wherein the elongated member is a plastic pin.

14. A head disk assembly for a disk drive comprising:

a base;

a spindle hub rotatably coupled to the base;

a disk secured to the spindle hub and having a recording surface;

a bearing cartridge;

a head stack assembly;

an elongated member;

the bearing cartridge including an inner shaft and an outer sleeve, the shaft being attached to the base and defining a pivot axis and the outer sleeve being rotatable relative to the pivot axis, the outer sleeve having a cylindrical sleeve surface;

the head stack assembly including an actuator body, a coil for a voice coil motor, transducer means for reading and writing from and to the recording surface, and means suspending the transducer means from the actuator body;

the actuator body having a bore and a slot located adjacent to the bore such that the slot opens into the bore;

the bore having a bore surface that defines a pair of ridges extending parallel to the length of the bore;

the bearing cartridge being disposed within the bore;

the elongated member being more compliant than the bore surface and more compliant than the sleeve surface, the elongated member being disposed in the slot such that the elongated member is positioned adjacent to the bearing cartridge and being compressed to provide a reacting force along a first contact line parallel to the pivot axis to bias the sleeve surface against the ridges to provide second and third contact lines each parallel to the pivot axis.

* * * * *